US010735900B1

(12) United States Patent
Werner et al.

(10) Patent No.: US 10,735,900 B1
(45) Date of Patent: Aug. 4, 2020

(54) RANGING MEASUREMENTS FOR SPATIALLY-AWARE USER INTERFACE OF A MOBILE DEVICE

(71) Applicant: Apple Inc., Cupertino, CA (US)

(72) Inventors: Benjamin A. Werner, San Jose, CA (US); Brent M. Ledvina, San Francisco, CA (US); Merrick K. McCracken, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/573,422

(22) Filed: Sep. 17, 2019

Related U.S. Application Data

(60) Provisional application No. 62/843,944, filed on May 6, 2019.

(51) Int. Cl.
*H04W 24/00* (2009.01)
*H04W 4/02* (2018.01)
(Continued)

(52) U.S. Cl.
CPC ......... *H04W 4/023* (2013.01); *G01S 13/0209* (2013.01); *G06F 16/9537* (2019.01);
(Continued)

(58) Field of Classification Search
CPC ....... H04W 4/023; H04W 4/14; H04W 72/10; H04W 4/029; G06F 16/9537; H04B 17/318; G01S 13/0209
(Continued)

(56) References Cited

U.S. PATENT DOCUMENTS

2004/0192331 A1* 9/2004 Gorday ................. H04W 4/029
455/456.1
2010/0144274 A1* 6/2010 Mcdowall ............... G01S 11/06
455/41.2
(Continued)

FOREIGN PATENT DOCUMENTS

GB          2466049 A       6/2010
WO    2017/181132 A2    10/2017

OTHER PUBLICATIONS

"International Search Report and Written Opinion," dated Jun. 8, 2020 in PCT/US2020/027557. 11 pages.

*Primary Examiner* — Marcos Batista
(74) *Attorney, Agent, or Firm* — Kilpatrick Townsend & Stockton LLP

(57) ABSTRACT

A method for identifying one or more other mobile devices in a vicinity of a first mobile device includes transmitting a first set of pulses to a second mobile device, receiving a second set of pulses from the second mobile device, and determining distance and angular information corresponding to transmission times of the first set of pulses and reception times of the second set of pulses received at the mobile device. The angular information indicates an angle between a pointing direction of the first mobile device and the second mobile device. A first probability that a position of the second mobile device lies within a first spatial region having a defined distance range and aligned with the pointing direction of the first mobile device is determined based on the distance information and the angular information. An importance metric for the second mobile device is determined based on the first probability.

30 Claims, 10 Drawing Sheets

(51) Int. Cl.
*H04W 4/029* (2018.01)
*H04W 4/14* (2009.01)
*H04W 72/10* (2009.01)
*G06F 16/9537* (2019.01)
*H04B 17/318* (2015.01)
*G01S 13/02* (2006.01)

(52) U.S. Cl.
CPC .......... *H04B 17/318* (2015.01); *H04W 4/029* (2018.02); *H04W 4/14* (2013.01); *H04W 72/10* (2013.01)

(58) Field of Classification Search
USPC .............................. 455/456.1–456.3; 370/338
See application file for complete search history.

(56) References Cited

U.S. PATENT DOCUMENTS

| | | | |
|---|---|---|---|
| 2014/0068469 A1* | 3/2014 | Lee | H04M 1/7253 715/761 |
| 2017/0131381 A1 | 5/2017 | Malik et al. | |
| 2018/0234797 A1 | 8/2018 | Ledvina et al. | |

\* cited by examiner

RANGING MEASUREMENTS FOR SPATIALLY-AWARE USER INTERFACE OF A MOBILE DEVICE

CROSS-REFERENCES TO RELATED APPLICATIONS

The present application claims the benefit of and priority to U.S. Provisional Application No. 62/843,944, filed May 6, 2019, the entire contents of which is incorporated herein by reference for all purposes.

BACKGROUND

Modern mobile devices (e.g., smartphones) may contain many applications. Certain applications may be designed to enable a user to interact with or communicate with other users. For instance, in addition to providing the capabilities of placing phone calls and sending SMS text messages, modern mobile devices may contain communication applications for composing email messages, instant messages, and for initiating video calls and video conferences. In some cases, a user may wish to know when other users included in a contact list are in the vicinity in order to interact or communicate with a particular contact. However, it may be difficult and time consuming for the user to find and select a desired recipient among all of the available contacts that the user wishes to interact or communicate with.

BRIEF SUMMARY

Embodiments can provide systems, methods, and apparatuses for determining range and angle measurements between a user of a mobile device and mobile devices of potential recipients of a communication from the user The importance of a user as a target for communication may be determined based on the probability of the target mobile device being present in one of several weighted regions with respect to a transmitting mobile device. Target devices may be ranked based on their importance, and icons representing users of the target devices may be displayed on a user interface display in rank order with the icon of the user of the highest ranked target device having the most prominent position in the display.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance and angle information, which can be used to determine a relative position of one mobile device to another. As examples, the relative position can include a distance value, angular (orientation) information between the two devices, or both.

Since these distance and angle measurements can be prone to errors (e.g., line-of-sight (LOS) obstructions, noise, bias, etc.), the position of a target device cannot be known precisely. Using the obtained measurements, the position of a target device may be estimated based on probabilities of the target device being located in a given region with respect to a transmitting device. Additionally, an importance metric may be calculated based on a combination of the probability of the target device being located in a given region and an importance score that is assigned to the region. The importance metric may be used to rank target devices in terms of which device the transmitting device would most want to communicate with, for example, to share a picture or to otherwise communicate.

I. Ranging

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

Figure 1:
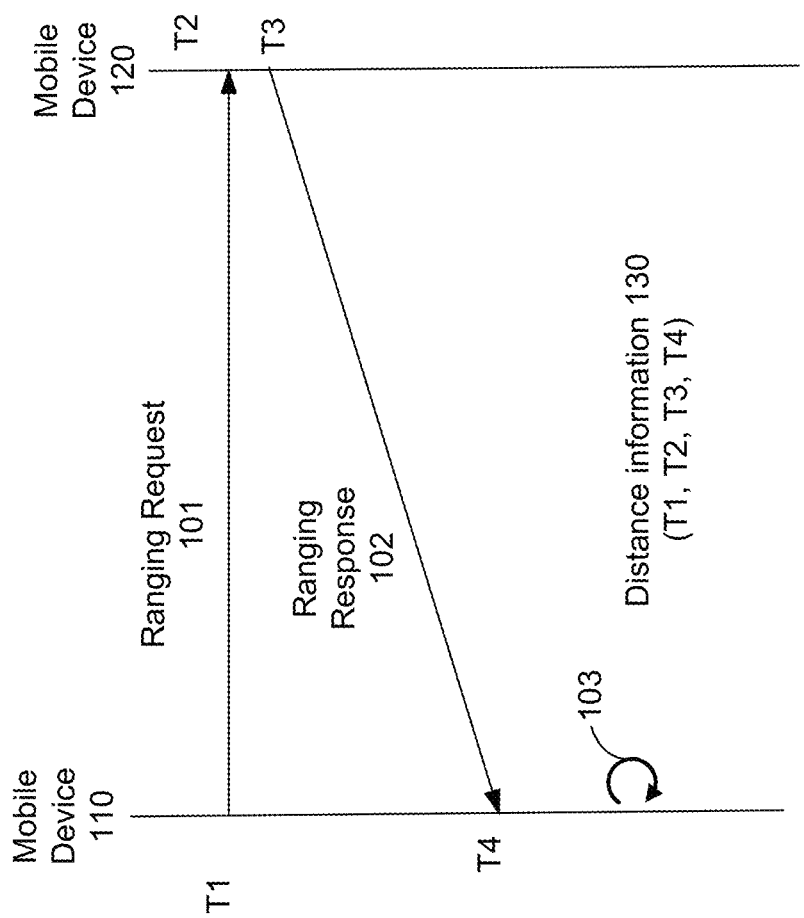
FIG. 1 shows a sequence diagram for performing a ranging measurement between two mobile devices according to embodiments of the present disclosure.

FIG. 1 shows a sequence diagram for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna.

Mobile device 110 (e.g., a smartphone) can initiate a ranging measurement (operation) by transmitting a ranging request 101 to a mobile device 120. Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, mobile device 110 transmits ranging request 101. At T2, mobile device 120 receives ranging request 101. T2 can be an average received time when multiple pulses are in the first set. Mobile device 120 can be expecting ranging request 101 within a time window based on previous communications, e.g., using another wireless protocol. The ranging wireless protocol and the another wireless protocol can be synchronized so that mobile device 120 can turn on the ranging antenna(s) and associated circuitry for a specified time window, as opposed to leaving them on for an entire ranging session.

In response to receiving ranging request 101, mobile device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that mobile device 110 can compute distance information. As an alternative, a delta between the two times (e.g., T3–T2) can be sent.

At T4, mobile device 110 can receive ranging response 102. Like the other times, T4 can be a single time value or a set of time values.

At 103, mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2–T1+T4–T3. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional position can be specified in various coordinates, e.g., Cartesian or polar, where polar coordinates can comprise an angular value and a radial value.

Figure 2:
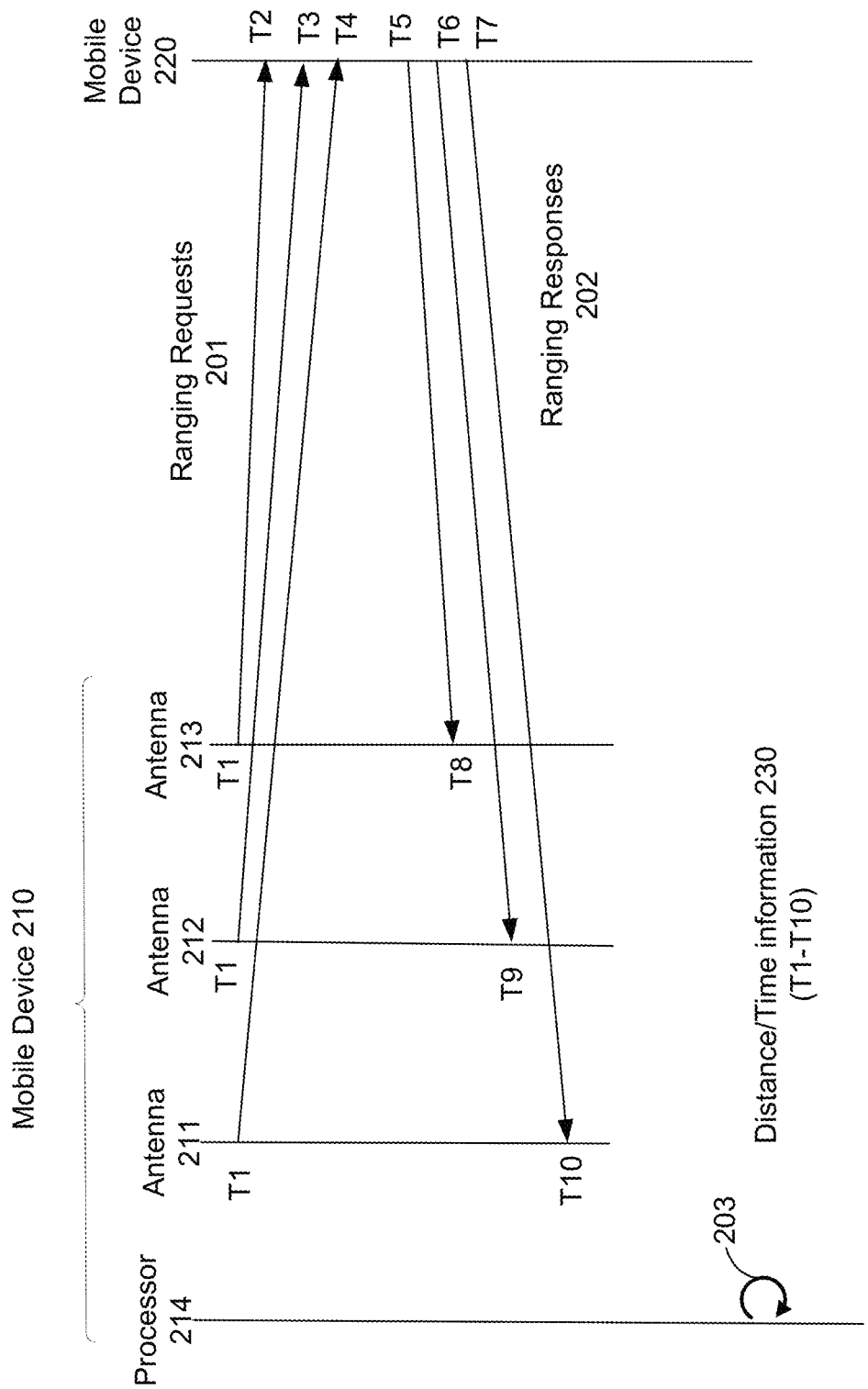
FIG. 2 shows a sequence diagram of a ranging operation involving a mobile device having three antennas according to embodiments of the present disclosure.

FIG. 2 shows a sequence diagram of a ranging operation involving a mobile device 210 having three antennas 211-213 according to embodiments of the present disclosure. Antennas 211-213 can be arranged to have different orientations, e.g., to define a field of view for performing ranging measurements.

In this example of FIG. 2, each of antennas 211-213 transmits a packet (including one or more pulses) that is received by mobile device 220. These packets can be part of ranging requests 201. The packets can each be transmitted at time T1, although they can be transmitted at different times in other implementations.

In some embodiments, mobile device 220 can have multiple antennas itself. In such an implementation, an antenna of mobile device 210 can send a packet to a particular antenna (as opposed to a broadcast) of mobile device 220, which can respond to that particular packet. Mobile device 220 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 201 are received at times T2, T3, and T4, respectively. Thus, the antenna(s) (e.g., UWB antennas) of mobile device 220 can listen at substantially the same time and respond independently. Mobile device 220 provides ranging responses 202, which are sent at times T5, T6, and T7, respectively. Mobile device 210 receives the ranging responses at times T8, T9, and T10, respectively.

At 203, processor 214 of mobile device 210 computes distance information 230, e.g., as described herein. Processor 214 can receive the times from the antennas, and more specifically from circuitry (e.g., UWB circuitry) that analyzes signals from antennas 211-213. As described later, processor 214 can be an always-on-processor that uses less power than an application processor that can perform more general functionality. Distance information 230 can be used to determine a 2D or 3D position of mobile device 220, where such position can be used to configure a display screen of mobile device 210. For instance, the position can be used to determine where to display an icon corresponding to mobile device 220, e.g., which position in a list, which position in a 2D grid, or in which cluster of 1D, 2D, or 3D distance/position ranges to display the icon.

In some embodiments, to determine which ranging response is from which antenna, mobile device 220 can inform mobile device 210 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 201 and ranging responses 202 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over 1 millisecond).

The packet frames in these messages can be on the order of 150 to 180 microseconds long.

C. UWB

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 GHz. Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a MAC layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 201 can correspond to stage 1 and ranging responses 202 can correspond to stage 2. Such use of an indicator may be helpful when more than two devices are performing ranging operations in near each other.

The narrow pulses (e.g., ~1 ns width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging wave form of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

II. Mobile Device for Performing Ranging

Figure 3:
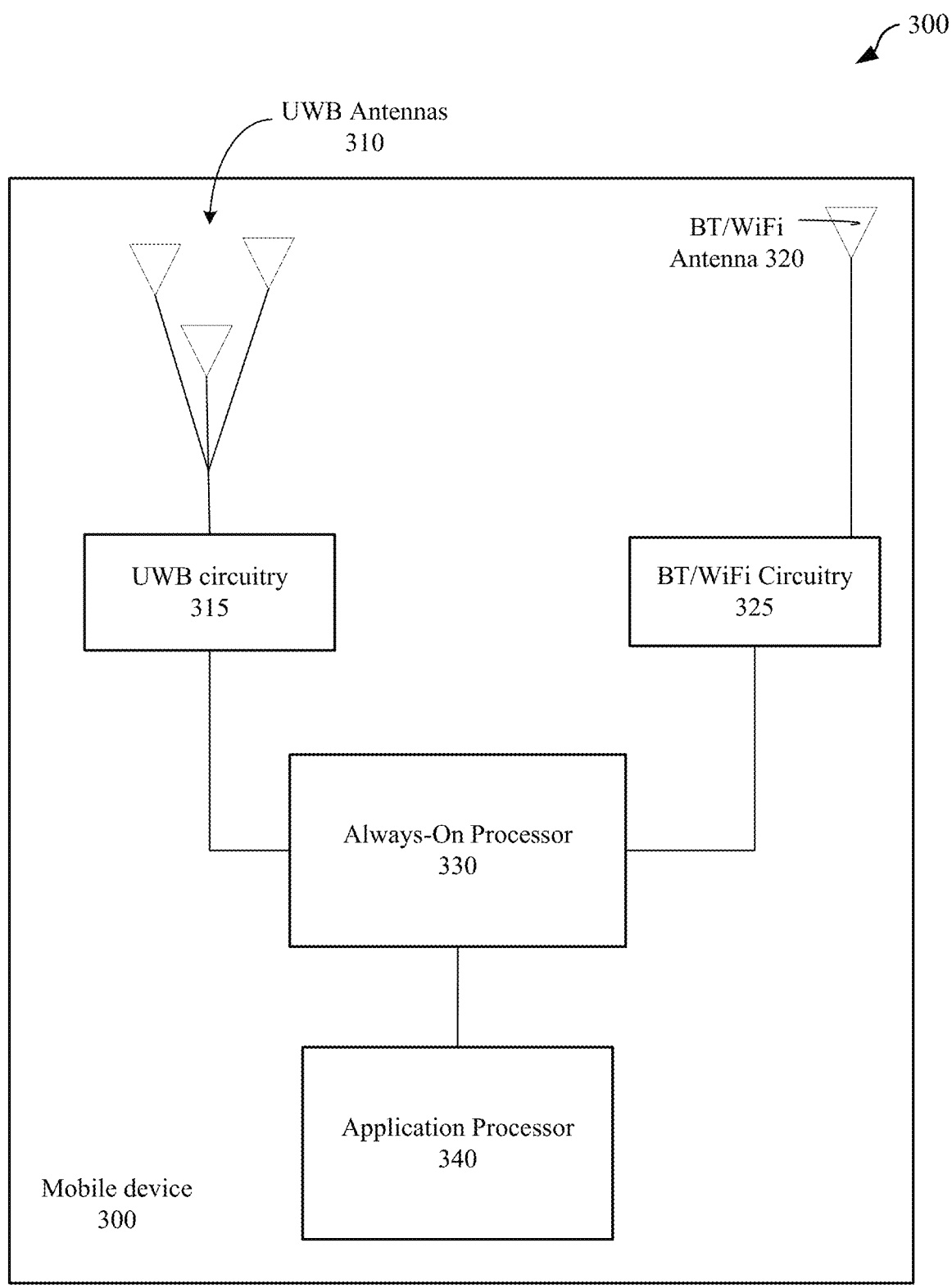
FIG. 3 is a block diagram of components of a mobile device operable to perform ranging according to aspects of the present disclosure.

FIG. 3 is a block diagram of components of a mobile device 300 operable to perform ranging according to aspects of the present disclosure. The mobile device 300 may include antennas for at least two different wireless protocols. The first wireless protocol (e.g., UWB) and the second wireless protocol (e.g., Bluetooth) may both be used for performing ranging with another mobile device.

As shown in FIG. 3, the mobile device 300 includes UWB antennas 310 for performing ranging. The UWB antennas 310 are connected to UWB circuitry 315 for analyzing detected signals from the UWB antennas 310. In some embodiments, the mobile device 300 includes three or more UWB antennas, e.g., for performing triangulation. The different UWB antennas can have different orientations, e.g., two in one direction and a third in another direction, which enable obtaining distance and angle information for target mobile devices. Triangulation can allow a determination of a direction to one or more other nearby target devices relative to direction a user is pointing the device. The orientations of the UWB antennas can define a field of view for ranging. As an example, the field of view can span approximately 120 degrees.

The UWB circuitry 315 can communicate with an always-on processor (AOP) 330, which can perform further processing using information from UWB messages. For example, AOP 330 can perform the ranging calculations using timing data provided by UWB circuitry 315. AOP 330 and other circuits of the device can include dedicated circuitry and/or configurable circuitry, e.g., via firmware or other software.

The mobile device 300 also includes BT/WiFi antenna 320. BT/WiFi antenna 320 is connected to BT/WiFi circuitry 325 for analyzing detected signals from BT/WiFi antenna 320. The BT/WiFi antenna 320 and BT/WiFi circuitry 325 may detect received signal strength indications (RSSI) from BT/WiFi antennas of other mobile devices in the vicinity, even from mobile devices that may be considered outside the field of view of the mobile device, for example, behind the user.

To perform ranging, BT/WiFi circuitry 325 can analyze an advertisement signal from another device to determine that the other device wants to perform ranging, e.g., as part of a process for sharing content. BT/WiFi circuitry 325 can communicate this notification to AOP 330, which can schedule UWB circuitry 315 to be ready to detect UWB messages from the other device. For the device initiating ranging, its AOP can perform the ranging calculations. Further, the AOP can monitor changes in distance between the other device. For example, AOP 330 can compare the distance to a threshold value and provide an alert when the distance exceeds a threshold, or potentially provide a reminder when the two devices become sufficiently close.

In some embodiments, UWB circuitry 315 and BT/WiFi circuitry 325 can alternatively or in addition be connected to application processor 340, which can perform similar functionality as AOP 330. Application processor 340 typically requires more power than AOP 330, and thus power can be saved by AOP 330 handling certain functionality, so that application processor 340 can remain in a sleep state, e.g., an off state. As an example, application processor 340 can be used for communicating audio or video using BT/WiFi, while AOP 330 can coordinate transmission of such content and communication between UWB circuitry 315 and BT/WiFi circuitry 325. For instance, AOP 330 can coordinate timing of UWB messages relative to BT advertisements.

III. Sharing Data Based on Range

A user of one mobile device may want to share data (e.g., a video or audio file) to another user. For example, the user's device can detect other nearby devices and display them as options for sharing the data. When two people (i.e., sender and receiver) are in a crowd of other users, the discovery process can identify multiple devices. Ranging may be used to identify an appropriate suggested recipient to share with.

A. Example Sharing Scenario

Figure 4:
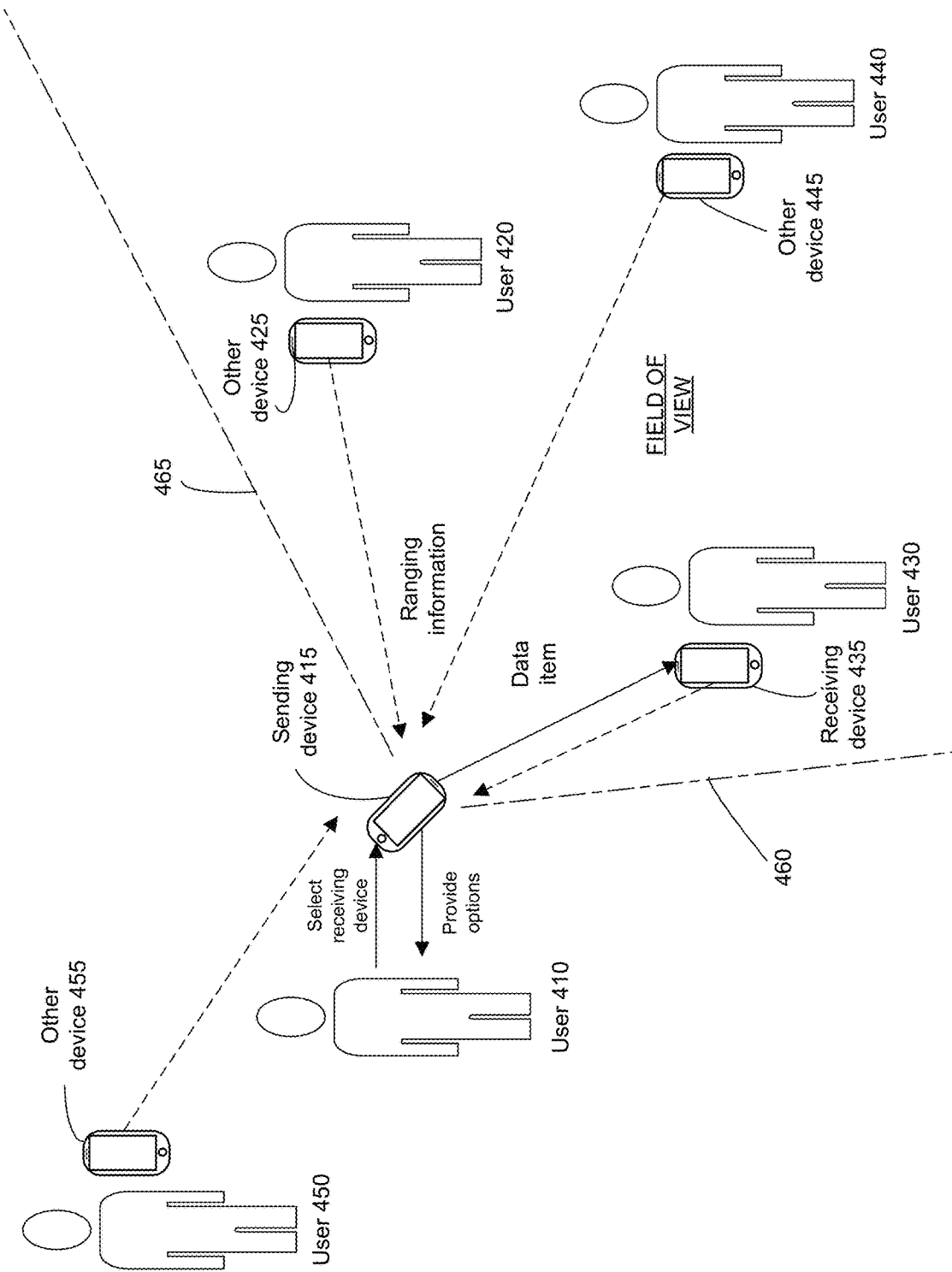
FIG. 4 shows an example sharing scenario of a mobile device using ranging to facilitate sharing a data item with another device according to embodiments of the present disclosure

FIG. 4 shows an example sharing scenario of a mobile device using ranging to facilitate sharing a data item with another device according to embodiments of the present disclosure. The data item could be various things, e.g., a contact, an audio file, an image, a video file, a deep link to a location in an application installed on both devices, and the like. A sharing session can be initiated by user 410 using a sending device 415.

A user 410 can initiate the sharing session on the sending device 415 in a variety of ways. For example, user 410 can select a data item, and then select a sharing option (e.g., a button on a graphical user interface (GUI)) to share the data item. The selection of the sharing option can begin a sharing process.

The sending device 415 can perform a ranging operation with each of the devices 425, 435, and 445, which can respond with ranging information, as depicted. Devices 425, 435, and 445 of users 420, 430, 440 may be within the field of view of the sending device 415 as illustrated by an area between line 460 and 465. Ranging may also be performed with device 455 of user 450 which is outside the field of view of the sending device 415, although with less accuracy. The sending device 415 can use the range information to determine distance and angle information, e.g., relative positions of the other devices. For example, if the sending device 415 includes multiple antennas (e.g., 3 antennas), sending device 415 can determine a position of each of the devices on a 2D grid relative to sending device 415. As another example, sending device 415 can determine a single distance value to each of the devices, where devices may be sorted in a list by this distance.

B. Configuring the Display for Sharing

The sending device 415 can use the distance and angle information for configuring a display on a screen of sending device 415. For instance, the position can be used to determine where to display an icon corresponding to a user 420 of mobile device 425, e.g., which position in a list, which position in a 2D grid, or in which cluster of 1D, 2D, or 3D distance/position ranges to display the icon.

Using the configured display of the mobile device 415, the user 410 can select which device to send the data item. As shown, device 435 is selected. The selection can be made in various ways, e.g., by touching an icon representing receiving device 435, which can be a picture of user 430. In other embodiments, the user 410 can point the sending device 415 at the receiving device 435 to achieve the selection. For instance, the device that is along a central axis pointing from the sending device can be automatically selected as the recipient of the data item. In this manner, the user 410 can easily see available devices and select the desired device. In some embodiments, the users can control which other devices can discover them and perform ranging, or whether the device will allow sharing. For example, a user can restrict such operations to those in the contact list or a subset of those in the contact list.

IV. Field of View

The distance and angle information can be used in a variety of ways. For example, the distance information can be used to display a relative position of the receiving mobile device on a screen of a sending mobile device, which is to send a data item. Such a user interface can allow a user to quickly and accurately select the recipient device, for example, devices that are frequently and/or recently messaged or mailed, for sending the data item, e.g., a video, audio, or a link to an application, as may be used to hand off an application at a particular location (e.g., page) in an application. A field of view in which target mobile devices may be detected may be defined for a transmitting mobile device based on the orientations of the three UWB antennas. The field of view for a mobile device may be visualized as a sector of a circle spanning approximately 120 degrees with the mobile device positioned at the center of the circle. Within the 120 degree field of view other sectors may be defined.

A. Sectors

Figure 5:
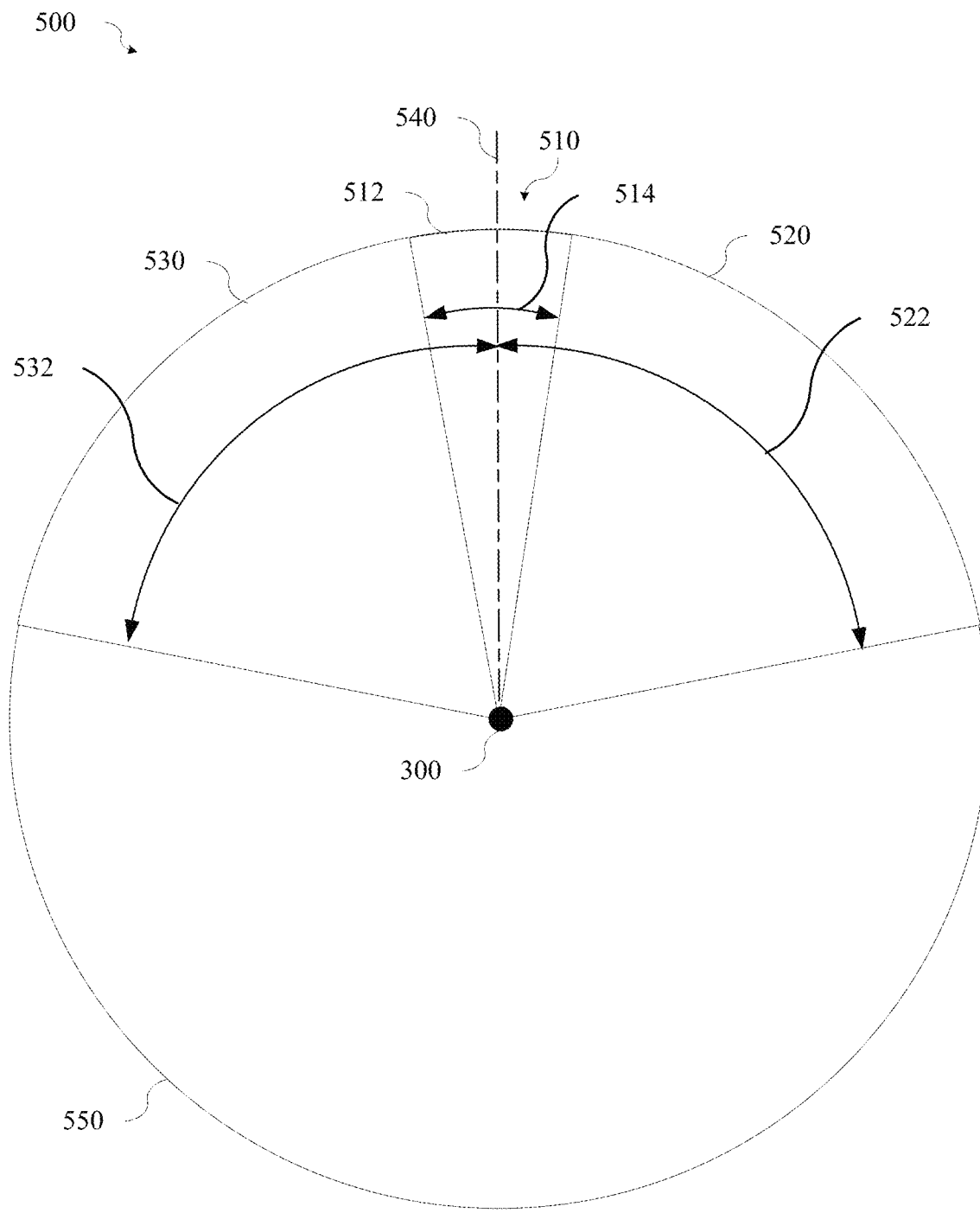
FIG. 5 is a diagram illustrating sectors a field of view of a mobile device according to aspects of the present disclosure.

FIG. 5 is a diagram illustrating sectors in a field of view 500 of a mobile device according to aspects of the present disclosure. Angle of arrival (AoA) information for UWB and/or BT ranging signals may be received within the field of view. Referring to FIG. 5, a pointing direction 510 within the field of view 500 of the mobile device (e.g., the mobile device 300) may be defined. The pointing direction 510 may be referenced relative to the top of a mobile device in a direction that a user points the mobile device and may be gravity dependent and UI dependent. For example, the mobile device may be held in a portrait or landscape mode (i.e., vertical or horizontal). The orientation of the mobile device may be sensed by a sensor of the mobile device (e.g., accelerometer, gyroscope, etc.). When the mobile device is held vertically (i.e., portrait mode), then the central axis of the field of view would extend from the top of the phone. Similarly, when the mobile device is held horizontally (i.e., landscape mode), then the central axis of the field of view would extend from the side of the phone, which would be pointing forward. An area encompassed by the pointing direction 510 may include a pointing sector 512 having a central angle 514 of approximately 25 degrees.

The field of view 500 of the mobile device may include a right side sector 520 and a left side sector 530, each having a central angle 522, 532 of approximately 60 degrees from a line 540 bisecting the pointing sector 512. The remaining sector 550 may be considered outside the field of view of the mobile device.

B. Regions

Figure 6:
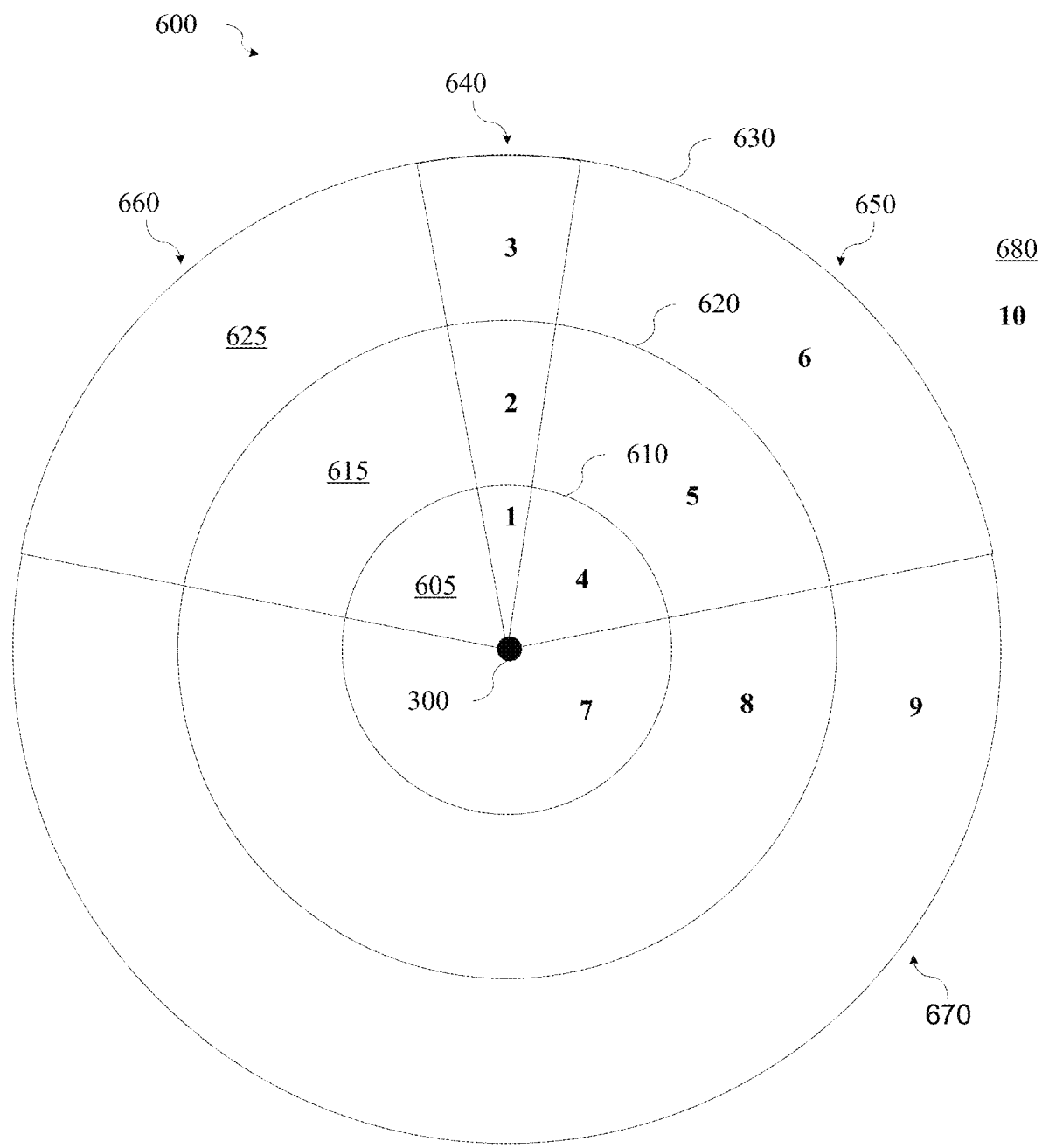
FIG. 6 is a diagram illustrating various areas that may be defined within a field of view according to aspects of the present disclosure.

FIG. 6 is a diagram illustrating various regions that may be defined within a field of view according to aspects of the present disclosure. The field of view may be visualized as a circular area with the transmitting mobile device (e.g., the mobile device 300) at the center. Areas that include radial distances from the transmitting mobile device may be defined. Referring to FIG. 6, a first radial distance area 605 may be defined between the mobile device 300 and a first radius 610, a second radial distance area 615 may be defined between the first radius 610 and a second radius 620, and a third radial distance area 625 may be defined between the second radius 620 and a third radius 630. While FIG. 6 illustrates three radial areas in the field of view, other radial areas may be defined without departing from the scope of the present disclosure.

Similarly, angular areas may be defined within the field of view. A pointing sector 640 may have a central angle of approximately 25 degrees. The pointing sector 640 may be an area relative to the top of a mobile device in a direction that a user points the mobile device. Side sectors 650, 660 to either side of the pointing sector 640 may have central angles of 60 degrees from a line bisecting the pointing sector 640 (as illustrated in FIG. 5). An additional sector 670 represented by the remaining portion of the circular area may be considered outside of the field of view.

The radial distance areas and angular area s may be combined to form regions in which target mobile devices may be positioned. Referring again to FIG. 6, regions 1-3 may be defined within the pointing sector 640 within the first radial distance area 605, the second radial distance area 615, and the third radial distance area 625, respectively. Similarly, regions 4-6 may be defined within the right side sector 650 within the first radial distance area 605, the second radial distance area 615, and the third radial distance area 625, respectively. Since the right side sector 650 and the left side sector 660 are symmetric about the pointing sector 640, during processing to determine target mobile device locations, the right side sector 650 and the left side sector 660 may be processed as one sector. Accordingly, only three regions (i.e., regions 4-6) are defined for the combination of side sectors 650, 660.

Target mobile devices located outside of the field of view, for example within the regions labeled 7, 8, and 9, within the additional sector 670 may still be detectable by the transmitting mobile device 300. For example, radial distance from the transmitting mobile device may be detectable based on RSSI measurements from the BT/WiFi antenna 320. Angle information, however, may not be obtainable. Target mobile devices located in the region labeled 10 (680) may be outside the detectable range of the transmitting mobile device.

C. Importance Scores for Regions

Each of the regions defined inside the field of view (i.e., regions 1-6) and outside the field of view (i.e., regions 7-9) in which a target mobile device may be detected may be assigned an importance score. For example, a static importance score for each region may be assigned based on a perceived desire of a user to communicate with a recipient located in each of the regions. As examples, the importance scores for the various regions may range from 0.1 to 1.0, but they may occur across any scale.

Figure 7:
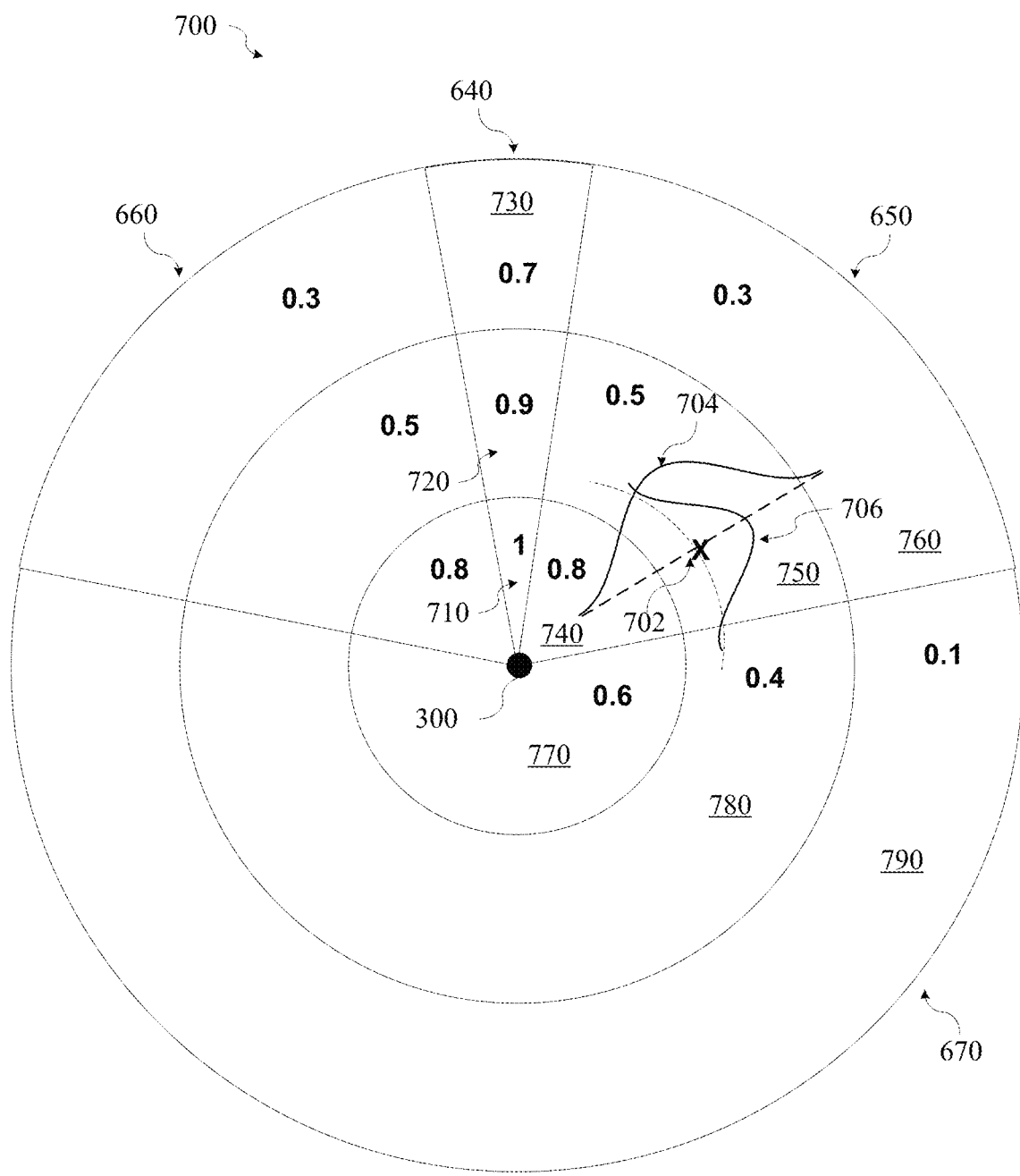
FIG. 7 is a diagram illustrating examples of importance scores assigned to the areas according to aspects of the present disclosure.

FIG. 7 is a diagram illustrating examples of importance scores assigned to the different regions according to aspects of the present disclosure. As can be seen in FIG. 7, the regions in the pointing sector 640 and the regions adjacent to the transmitting mobile device 300 (e.g., region 740) may be assigned the highest importance scores since a user is more likely to want to share with users of these devices. As previously discussed, the right side sector 650 and the left side sector 660 are symmetric about the pointing sector 640 and may be processed as one sector. Accordingly, each regions in the left side sector 660 corresponding to the regions 740, 750, and 760 in the right side sector 650 may be assigned the same importance score. Regions outside the field of view may also be assigned importance scores. For example, region 770 may have a highest importance score of the regions outside the field of view since a user is likely to communicate with a close recipient even if the recipient is outside the field of view. Importance scores for regions 780 and 790 may be lower since the user is less likely to communicate with recipients outside the field of view and farther away.

V. Estimation (Probabilities)

Mobile devices detected in the vicinity of the transmitting mobile device, both inside and outside of the field of view of the transmitting mobile device, may be ranked in terms of which devices the transmitting device would most want to communicate with, for example, to share a picture or to otherwise communicate. For example, a representation of a given number of highly ranked detected mobile device may be displayed on a user interface (UI) with a representation of the highest ranked mobile device most prominently displayed and representations of one or more other highly ranked mobile devices oriented around the highest ranked mobile device based on their angular information.

Ranking of the detected mobile devices (also referred to herein as "neighbors") may be based on the importance metric determined for each detected target mobile device. The importance metric may be based in part on the location of a neighbor in a particular regions. However, measurement inaccuracies (e.g., line-of-sight (LOS) obstructions, noise, bias, drift, etc.) may prevent accurate determination of neighbor locations, both within the field of view and outside the field of view. Even within the field of view, a probability of false detection of a target mobile device exists. Probabilistic estimation may be used to mitigate the effects of these inaccuracies.

A. Location Detection

For each detected neighbor, the probabilities of being in each of the separate regions 1 through 9 as illustrated in FIG. 6 may be tracked. Distance and angle measurements may be used to weight the probabilities of a neighbor device being in each of the regions.

Given the importance score and the probabilities, an importance metric for each neighbor may be calculated. The importance metric may be used to order lists, and determine the most important neighbor to show, for example as a most prominent icon on a UI display. Based on UI orientation and AoA information, angles for displaying additional neighbors on an arc around the most important neighbor on the UI may be set.

1. Probability of Radial Location

As discussed above, distance from the transmitting mobile device may be determined using UWB and/or BT. In cases where both transmitting and neighbor devices are capable, UWB may be used to determine distance and angle to estimate the location of the neighbor within the field of view. In some cases, a combination of BT and UWB may be used to determine distance to a neighbor in the field of view. For example, BT and UWB may be used simultaneously or alternately (e.g., time domain multiplexing (TDM)) to estimate distance. In some cases, BT RSSI may be used for an initial range estimation and then UWB to more accurately estimate range. If angle information cannot be obtained, the range information alone may be used. If UWB information is not available, BT received signal strength indicator (RSSI) measurements may be used to estimate range. In cases where a neighbor is not located within the field of view, for example behind the user (e.g., within the region 7 in FIG. 6), the omnidirectional WiFi signal and/or BT received signal strength indicator (RSSI) measurements, alone or in conjunction with may be used UWB may be used to determine distance. The measurements, however, only approximate the distance.

The UWB measurements may provide a distance measurement and an angle measurement as well as an accuracy for both measurements. From the distance and accuracy, a probability distribution, for example, a Gaussian distribution, in the radial direction may be derived with the distance measurement being correlated to a mean and the accuracy being correlated to a variance. For example, referring again to FIG. 7, a UWB measurement may return a distance and accuracy measurement for a target device at point X 702. A radial probability distribution 704 may be generated based with the distance and accuracy correlated to the mean and variance, respectively, of the distribution. Based on the radial probability distribution 704, a probability of the device at point X 702 actually being located in a particular region may be determined by integrating the probability distribution. For example, the portion of the radial probability distribution 704 lying in the region 740 may be integrated to determine a probability that point X 702 is actually located in the region 740.

Similarly, the portion of the radial probability distribution 704 lying in the region 750 may be integrated to determine a probability that point X 702 is actually located in the region 750. It should be noted that the radial probability distribution 704 will approach, but not reach, zero as it extends outward from the mean (i.e., point X 702). However, integration of the radial probability distribution 704 further than the variance may result in substantially insignificant probabilities that point X 702 is located in the corresponding regions. For example, integration of the radial probability distribution 704 lying in the region 760 may yield substantially insignificant probabilities that point X 702 is located in the region 760. A radial location probability may be determined for the point X 702 being located in each of the regions 710-790 as illustrated in FIG. 7. Initial probability estimates prior to receiving measurement data may be uniform probability distributions based on the areas of the regions.

In some implementations, integrating the probability distribution (e.g., determining the cumulative distribution function (CDF)) may be accomplished using a software library function ERF, which is an error function that approximates the CDF for a Guassian distribution. Other probability distributions, for example, but not limited to, a uniform distribution, may be used.

2. Probability of Angular Location

Similar to the distance measurement, the UWB measurement may return an angle and accuracy measurement for a target device at point X 702. An angular probability distribution 706 may be generated based with the angle and accuracy correlated to the mean and variance, respectively, of the distribution. Based on the angular probability distribution 706, a probability of the device at point X 702 actually being located in a particular region may be determined by integrating the angular probability distribution 706. An angular location probability may be determined for the point X 702 being located in each of the regions 710-790 as illustrated in FIG. 7.

When the mobile device is rotated (e.g., the pointing direction is changed), for example, as determined by the accelerometer or gyroscope of the mobile device, angle measurements to detected target devices may change by a corresponding amount. In some cases, the change in angle may cause a target device to be moved outside of the field of view. In that case, the field of view detection may cause the probabilities to be multiplied by Pfa rather than 1−Pfa as in the previous measurements. If the angle measurements do not change by a corresponding amount, the measurements may be discarded and new measurements performed.

While the radial probability distribution and the angular probability distribution have been separately described, the distributions may be combined into a single two-dimensional probability distribution that can be integrated over any region to determine the probability for a region.

B. Field of View Detection

An initial detection may be performed to determine whether a target mobile device is in the field of view (e.g., within one of the left side 530, right side 520, or pointing 512 sectors) or outside the field of view (e.g., within the remaining sector 550). For example, the UWB antennas ideally measure angle only in the defined field of view. However, the UWB antennas can also receive signals from outside of the field of view. In some implementations, an indication as to whether a detected target is within the field of view may be provided by hardware, for example, the UWB circuitry 315. In some implementations the field of view indication may be provided by software based on the received distance and angle measurements.

The initial detection may have an associated probability of false alarm (Pfa) such that a detection of a target device as being within the field of view is actually outside the field of view. Thus, there is an uncertainty which is the likelihood that the angle came from the field of view. The signals from outside of the field of view can be misinterpreted as from coming inside that field of view. This misinterpretation is this probability of false alarm (Pfa). For an example probability of 5% false alarm, probabilities for a target device being located in each of the regions outside the field of view may be multiplied by the Pfa (i.e., 5%) and probabilities for a target device being located in each of the regions inside the field of view may be multiplied by 1-Pfa (i.e., 95%). If the field of view indication is that the detected target is outside the field of view, probabilities for a target device being located in each of the regions inside the field of view may be multiplied by the Pfa (i.e., 5%) and probabilities for a target device being located in each of the regions outside the field of view may be multiplied by 1-Pfa (i.e., 95%).

C. Position Estimation

The location of a detected target mobile device may be estimated based on the radial location probability, the angular location probability and the probability of false alarm (Pfa). A location estimation may be generated for each of the regions 710-790 as illustrated in FIG. 7. As an example, assume for region 750, point X 702 has a radial location probability of 0.6 and an angular location probability of 0.4. Further, assume that the field of view indication is that point X 702 is inside of the field of view so 1−Pfa is 0.05. Since the probabilities are assumed to be independent, the probabilities may be multiplied to determine the total probability that point X 702 is located in region 750. Using those example numbers, the probability that point X 702 is located in region 750 is 0.6×0.4×0.95=0.23. Thus, it may be estimated that point X 702 is located in region 750 with a 23% probability. Location estimation may be similarly performed for each of the regions 710-790 as illustrated in FIG. 7.

It should be noted that for explanation the radial location probability and the angular location probability were considered separately. However, an integration over a two-dimensional probability distribution would determine the total probability that a point is located in a given region.

1. Time Effects

As time passes or the neighbor device undergoes movement, the probabilities may spread to adjacent regions. For example, referring to FIG. 6, as time passes there is a probability that a neighbor initially located in the regions labeled 2 may move to one of regions 1 or 3-6. As new measurements are received, new total probabilities for a target to be located in a given region may be calculated. In order to maintain stability in the rank order of target devices (e.g., as displayed on the UI), the new total probabilities may be combined with the existing total probabilities. For example, a weighted average of the existing total probabilities and the new total probabilities may be used to smooth out the resulting total probabilities over time.

In some cases, no new measurements may be received. In such cases, a time function may operate on the probability function to spread the confidence level of the probability function. A "confidence level" corresponds to a probability that a model can make a correct prediction (i.e., at least one of the predicted recipient(s) was chosen after the event) based on the historical interactions data. An example of a confidence level is the percentage of events where a correct prediction was made (i.e., a predicted recipient was suggested and chosen as a recipient for a communication). Another example uses a cumulative distribution function (CDF) of a probability distribution (e.g., beta distribution) generated from the number of correct and incorrect predictions. The CDF can be computed by integrating the probability distribution. In various implementations, the confidence level can be the amount of increase in the CDF past an input value (e.g., between 0 and 1, with 1 corresponding to a correct recipient prediction) or the input value providing a specified CDF past the input value. The probability of a recipient being selected can be required to be a threshold probability, which is the corollary of the model having a confidence level above a confidence threshold. The confidence level can be inversely proportional to a measure of entropy, and thus an increase in confidence level from a parent model to a sub-model can correspond to decrease in entropy.

Repeatedly applying the time function can spread the total probabilities to neighboring regions. For example, matrix operations with off-diagonal elements can operate on the probabilities to include probabilities from neighboring regions. Repeated application of the matrix operations may cause the total probabilities to move towards more uniform values.

2. Target Devices Having Same Estimated Position

In some cases, two or more target devices may have approximately the same estimated location in the field of view. In order to determine the most likely person for communicating with, a candidate list of the two or more people in the field of view may be provided to a suggestion engine. A suggestion engine may determine who the user is more likely to communicate with based on who the user has communicated with in the past. The suggestion engine may be implemented by, for example, the application processor 340 or another processor of the mobile device. Further details regarding the suggestion engine can be found in U.S. Provisional Application No. 62/843,895 filed on May 6, 2019, the contents of which are incorporated herein by reference in their entirety for all purposes.

The suggestion engine may run the candidate list of people in the field of view through a frequency-recency model, for example a K Nearest Neighbor (KNN) model. Such a model can use frequency and recency of occurrences of sharing with people in the candidate list as well as other information such as which app was involved in sharing to determine an order in which the user is likely to communicate with each candidate. The model may rank the candidates in the candidate list in order of which candidates the user is most likely to communicate with. The most likely candidate for communication may be displayed as the magic head.

VI. Importance Metric

An importance metric may be determined for each target mobile device detected by the transmitting mobile device. The importance metric may determine ordering of suggested target device users displayed on a UI of the transmitting mobile device. The importance metric may be calculated by for each target device by multiplying the location estimation for the target device in each region (e.g., regions 710-790 in FIG. 7) by the corresponding importance value for the region as illustrated in FIG. 7 and summing the products of all the regions. Target devices may be ranked in descending order based on the importance metric. An icon representing a user of the highest ranking target device may be displayed in a prominent position (e.g., the magic head) on the user interface.

The importance metric may be calculated by for each target device may be compared to a threshold. An importance metric exceeding the threshold may indicate that a target device is a device that the user of the transmitting device may wish to communicate with. Icons representing users of target devices exceeding the threshold may be displayed on the UI of the transmitting device. The threshold may be a fixed value or may be a value of a next highest importance metric for another target device.

VII. Example User Interface

The list of suggested targets for communication based on the importance metric may be displayed on a user interface (UI) of the mobile device. The list may be displayed in graphical form, for example using icons or photos to represent the suggested recipients and icons to represent the suggested app. Alternatively, the suggestion list may be displayed in a list form.

A. Display

Figure 8:
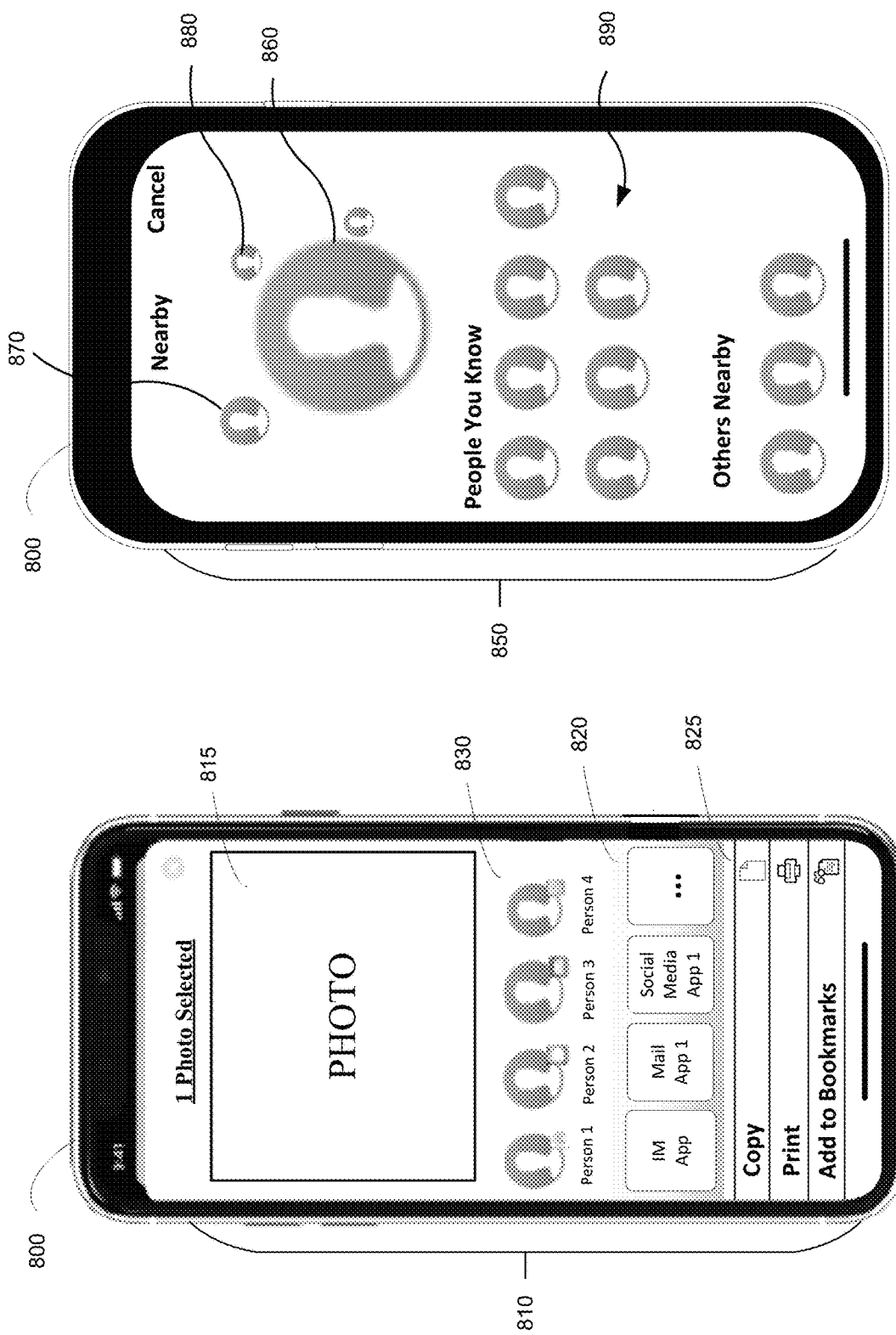
FIG. 8A is an illustration of a mobile device with a user interface displaying suggested applications and suggested recipient/application pairs according to aspects of the present disclosure.
FIG. 8B is an illustration of a mobile device with a user interface displaying suggested recipients based on proximity according to aspects of the present disclosure.

FIG. 8A is an illustration of a mobile device 800 with a user interface 810 displaying suggested applications and suggested recipient/application pairs according to aspects of the present disclosure. A "user interface" corresponds to any interface for a user to interact with a device. A user interface for an application allows a user to interact with the application. The user interface could be an interface of the application when the application is running. As another example, the user interface can be a system interface that provides a reduced set of applications for users to select from, thereby making it easier for a user to use the application. In this example, mobile device 800 can be executing a host application (e.g., in background) and display a window of a sharing routine with a sharing routine user interface window 810 overlaying and partially or entirely obscuring the host application window.

User interface 810 indicates that the user of the mobile device 800 has selected a photo 815, from within the host application to be shared with one or more other applications, users, or devices. The host application may be any number of possible applications, such as photograph library applications, Internet browser applications, social media applications, etc. As noted above, the host application may provide a dedicated button, icon, or menu option to initiate the sharing user interface 810.

When the sharing routine is initiated by the host application, the sharing user interface 810 can display any one or more of: the content object 815 to be shared (e.g., for a photo or not display the content object, e.g., for a URL of a website), a user-selectable list of one or more possible applications 820 (example selectable components) that may be used to share the content object, and a list of additional capabilities 825 corresponding to other functions supported by the mobile device 800 for the content object (e.g., copy, print, add to bookmarks). Additionally, the sharing user interface window 810 may include a user-selectable list of suggested recipients 830 for sharing the content object, as other examples of selectable components. In this example, the user-selectable list of suggested recipients 830 includes recipient-application combinations, as a small app icon is displayed in combination with each recipient. The recipients may also be displayed without an associated application.

Although individual user faces are not shown in the example interface of FIG. 8A, in certain embodiments the sharing routine may be configured to look-up each of the received recipients in one or more data sources (e.g., the user's contacts list, phone book, social media contacts list, etc.) and may retrieve additional data such as an image of the recipient, nickname, or other personal data, which then may be incorporated in the recipient suggestion list 830 of the sharing user interface 810.

The sharing routine then may receive user selections of one or more applications to be used for sharing the content object and/or one or more recipients with whom the content object is to be shared. For example, the user may select one of the specified applications 820 with which to share the content object 815, or may select the ellipsis to view and select additional applications. Alternatively, the user may select one of the specified recipient-application combinations 830.

It should be understood that the suggested sets of applications 820, and the suggested recipient-application combinations 830, may correspond to the suggestions determined by the suggestion engine using the techniques discussed above, and returned to the sharing routine. The suggestions may include likelihood (probability) values that specify how the suggestions should be ordered (e.g., for each of the two lists). Alternatively, the suggestions can be sent in the order that they are to be displayed. Further details regarding the sharing routine can be found in U.S. Provisional Application No. 62/843,895.

In some embodiments, proximity information may be used to determine where a suggested recipient is displayed on a screen. As described above, proximity to other devices may be measured using ranging signals (e.g., UWB), e.g., to measure time of flight between the devices. Device 800 may include multiple antennas (e.g., 3 antennas) that can allow a determination of an angle to the other device. This spatial information can be used to point mobile device 800 at a second device, and mobile device 800 can determine a location of that second device in a radial and 360 degree perimeter around mobile device 800.

FIG. 8B is an illustration of a mobile device 800 with a user interface 850 displaying suggested recipients based on proximity according to aspects of the present disclosure. The user interface 850 may be displayed when the user makes a selection, for example, a 'nearby' button (not shown) to see which other users may close by.

The transmitting mobile device may provide the user interface 850 to display one or more icons of users of the target devices in response to determining that the importance metric for a target mobile device exceeds a threshold. The display may show a ranked set of icons corresponding to users of target devices having the highest importance metrics as suggestions for the transmitting mobile device to communicate with. The icon for the user of the mobile device having the highest ranking importance metric may be displayed in a most prominent position on the UI, for example a large icon centered in a portion of the display.

In FIG. 8B, a user of target device having the highest ranking importance metric may be indicated by a prominently displayed icon 860 on the user interface of the transmitting device. For example the prominently displayed icon 860 may be a larger icon than icons of users of other ranked target devices. The distance and angle information for target devices having the next highest ranked importance scores may be used to display icons 870, 880 for those users in relative positions on an arc around the icon of the highest ranked user. The icons 890 of users of other ranked target devices may be displayed in rank order elsewhere on the user interface.

Although individual user faces are not shown in the example interface of FIG. 8B, in certain embodiments the sharing routine may be configured to look-up each of the received recipients in one or more data sources (e.g., the user's contacts list, phone book, social media contacts list, etc.) and may retrieve additional data such as an image of the recipient, nickname, or other personal data, which then may be incorporated in the recipient suggestion list of the user interface 850 including the prominently displayed icon 860, the icons 870, 880 for those users in relative positions on the arc, and the icons 890 of users of other ranked target devices.

B. User Interface Updates

The UI may update over a period of time as more information is obtained. In order to prevent the displayed list of suggested recipients from changing frequently, heuristics may be applied to minimize UI updates such that the displayed list does not change as a user is about to select from the list. For example, the displayed list may not change unless the user performs an action, for example, switching to another UI, shaking the device, etc., suggesting that a change to the list may take place or substantial changes to the estimated positions of recipients are detected. Conversely, holding the device at a certain angle for a period of time may be an indication that the user is looking at the UI and may be about to make a selection. In that case, the list may not be changed. In some cases, changes to the displayed list may be made slowly such that the user will know the list is changing and can delay a selection. For example, an indication such as a warning flash or blinking of an icon, a color change or fading out of an icon, or some other indication may be provided to alert the user that the list may change.

VIII. Flowchart

Figure 9:
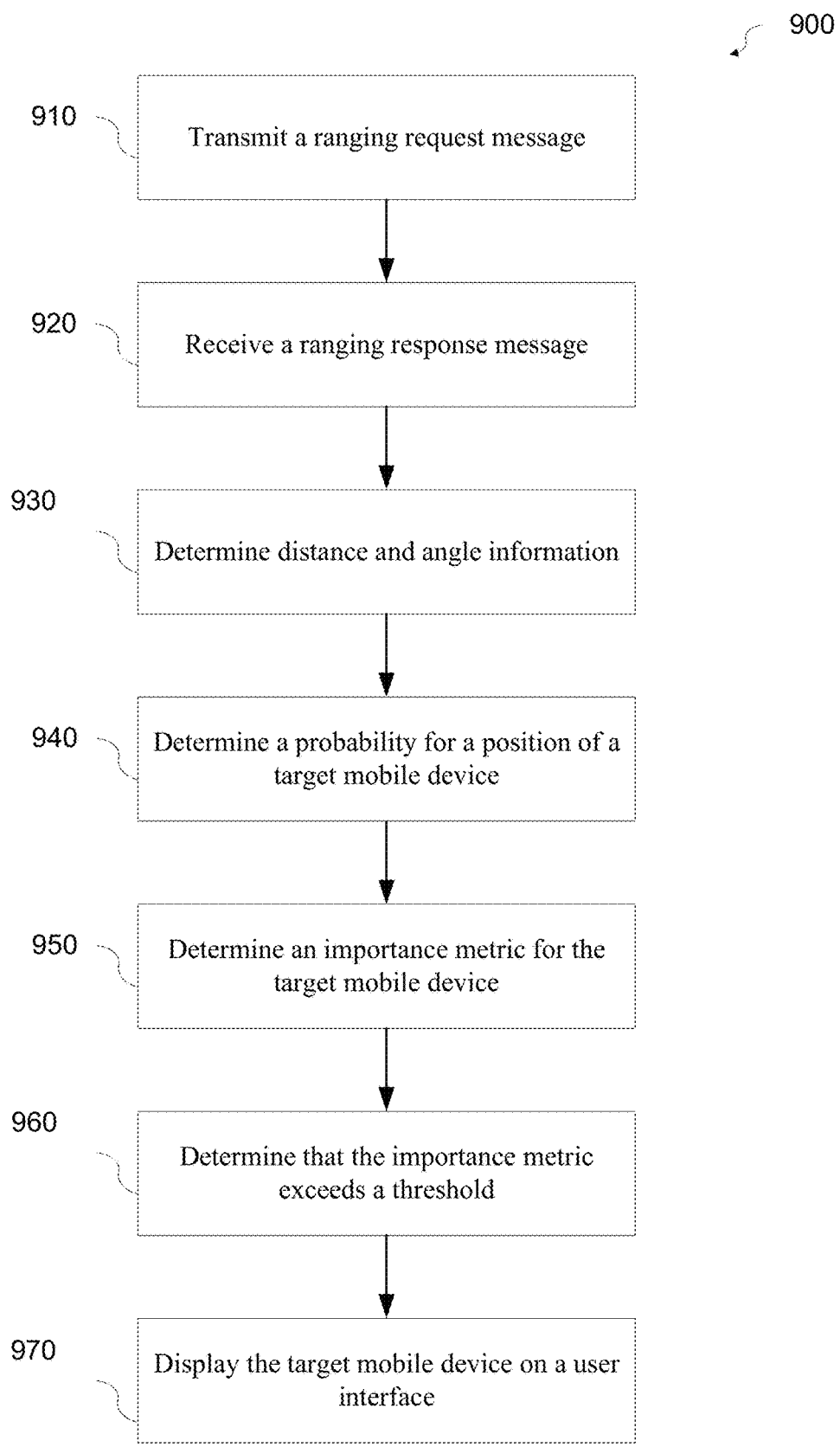
FIG. 9 is a flowchart illustrating a method for identifying one or more other mobile devices in a vicinity of a first mobile device according to aspects of the present disclosure.

FIG. 9 is a flowchart illustrating a method 900 for identifying one or more other mobile devices in a vicinity of a first mobile device according to aspects of the present disclosure. The method determines a probability that a target device is located in spatial region with respect to a transmitting mobile device and determines an importance of the target mobile device for communication with the transmitting mobile device.

At block 910, a ranging request message may be transmitted by a first (i.e., transmitting) mobile device. The transmitting mobile device may transmit a ranging request message to a second (i.e., target) mobile device using a first wireless protocol. The ranging request message may be a first set of one or more pulses transmitted via a plurality of antennas. The plurality of antennas may be configured to receive signals using the first wireless protocol. The first wireless protocol may be, for example, but not limited to, a UWB protocol.

At block 920, the transmitting mobile device may receive a ranging response message. The transmitting mobile device may receive, at the plurality of antennas, one or more ranging response messages. The ranging response messages may be a second set of one or more pulses received from the second mobile device.

At block 930, the transmitting mobile device may determine distance and angle information. The transmitting mobile device may determine the distance information and angular information corresponding to one or more transmission times of the first set of one or more pulses (i.e., ranging request message) and one or more reception times of the second set of one or more pulses (i.e., the ranging response messages) received at the plurality of antennas. The angular information may indicate an angle between a pointing direction of the transmitting mobile device and the target mobile device.

At block 940, the transmitting mobile device may determine a first probability for a position of a target mobile device. The first probability may be determined based on the distance information and the angular information. The first probability may be a probability that a position of the target mobile device lies within a first spatial region having a defined distance range and aligned with the pointing direction of the first mobile device. The first probability may be based on radial probability distribution and an angular probability distribution combined into a single two-dimensional probability distribution.

At block 950, the transmitting mobile device may determine an importance metric for the target mobile device based on the first probability. The transmitting mobile device may store in a memory a set of importance values corresponding to a set of spatial regions defined at specified distances and angles around the transmitting mobile device. The set of spatial regions may include the first spatial region. Based on the distance information and the angular information, the transmitting mobile device may determine a set of probabilities of the target mobile device being within the set of spatial regions, the set of probabilities including the first probability.

The transmitting mobile device may determine the importance metric for the second mobile device based on the set of probabilities and the set of importance values. Each of the set of probabilities may be multiplied by a corresponding importance value to obtain intermediate results, and the intermediate results summed. Prior to multiplying by the importance values, Each of the set of probabilities may be multiplied by a second probability based on whether the target mobile device is determined to be within or outside a field of view of the transmitting mobile device.

At block 960, the transmitting mobile device may determine that the importance metric exceeds a threshold. As examples, the threshold can be a fixed value or a value equal to a second highest importance metric. Thus, the threshold can ensure that the highest importance metrics are determined.

At block 970, the transmitting mobile device may display the target mobile device on a user interface. In response to determining that the importance metric for the target mobile device exceeds the threshold, the transmitting mobile device may provide a user interface to display an icon of the user of the target device. The display may show a set of icons corresponding to users of target devices having the highest importance metrics as suggestions for the transmitting mobile device to communicate with. The icon for the user of the mobile device having the highest ranking importance score may be displayed in a most prominent position on the UI.

IX. Example Device

Figure 10:
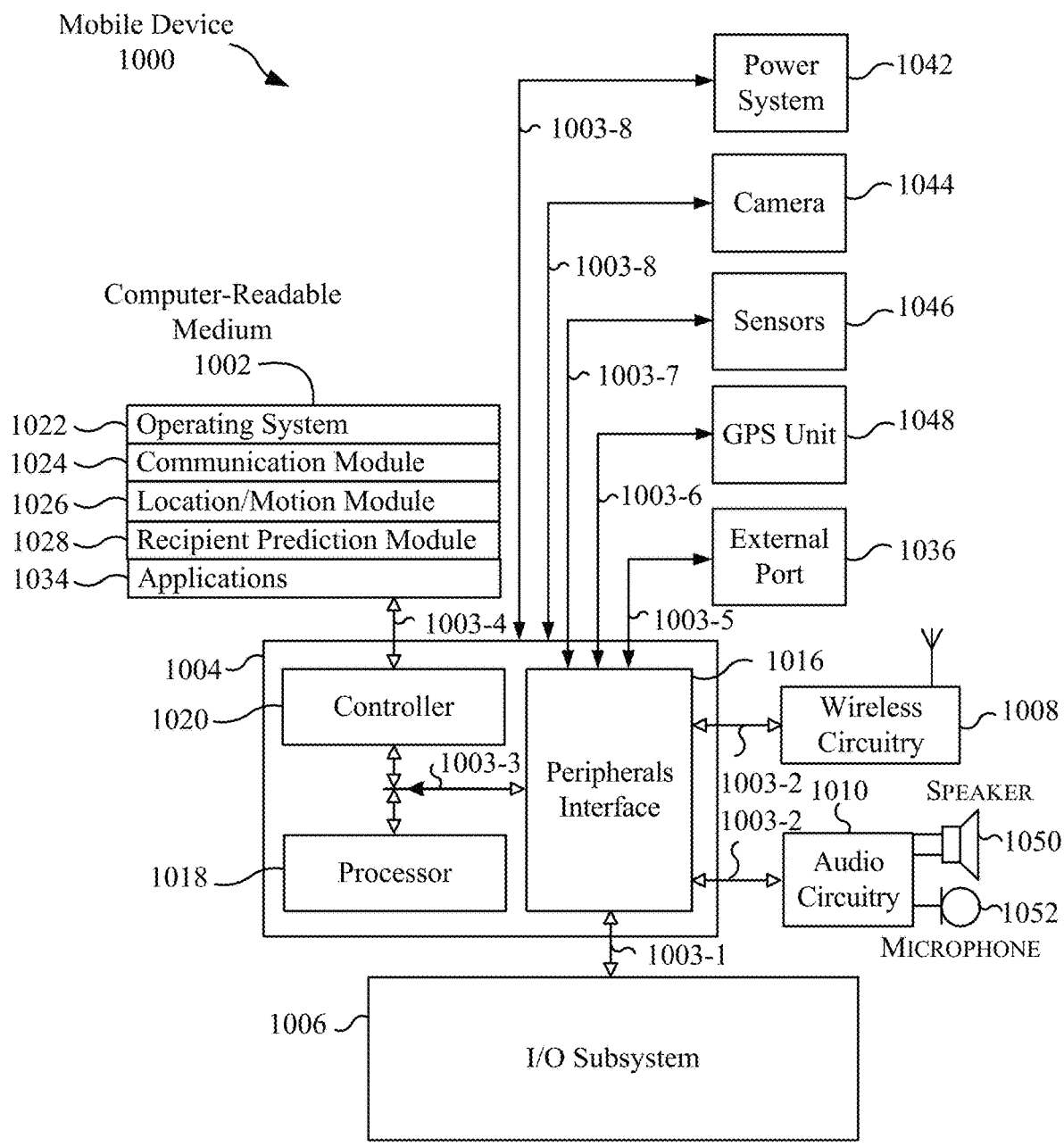
FIG. 10 is a block diagram of an example of a device according to aspects of the present disclosure.

FIG. 10 is a block diagram of an example device 1000, which may be a mobile device. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a vehicle display device, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors

1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, a recipient suggestion module (or set of instructions) 1028, and other applications (or set of instructions) 1034, such as a car locator app and a navigation app.

Operating system 1022 can be any suitable operating system, including iOS, Mac OS, Darwin, RTXC, LINUX, UNIX, OS X, WINDOWS, or an embedded operating system such as VxWorks. The operating system can include various procedures, a plurality of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifier) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

Recipient suggestion module 1028 can include various sub-modules or systems. Recipient suggestion module 1028 can perform all or part of method 900.

The one or more applications 1034 on the mobile device can include any applications installed on the device 1000, including without limitation, a browser, an address book, a contact list, email, instant messaging, video conferencing, video calling, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a plurality of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve prediction of users that a user may be interested in communicating with. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to predict users that a user may want to communicate with at a certain time and place. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of people centric prediction services, the present technology can be configured to allow users to select to "opt in" or "opt out" of participation in the collection of personal information data during registration for services or anytime thereafter. In another example, users can select to not provide precise location information, but permit the transfer of location zone information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users that a user may want to communicate with at a certain time and place may be predicted based on non-personal information data or a bare minimum amount of personal information, such as the content being requested by the device associated with a user, other non-personal information, or publicly available information.

Although the invention has been described with respect to specific embodiments, it will be appreciated that the invention is intended to cover all modifications and equivalents within the scope of the following claims.

All patents, patent applications, publications, and descriptions mentioned herein are incorporated by reference in their entirety for all purposes. None is admitted to be prior art.

What is claimed is:

1. A method for identifying one or more other mobile devices in a vicinity of a first mobile device, the method comprising performing, by the first mobile device:
    transmitting, using a first wireless protocol, a first set of one or more pulses in a ranging request message to a second mobile device, the first mobile device including a plurality of antennas configured to receive signals using the first wireless protocol;
    receiving, at the plurality of antennas, a second set of one or more pulses in one or more ranging response messages from the second mobile device;
    determining distance information and angular information corresponding to one or more transmission times of the first set of one or more pulses and one or more reception times of the second set of one or more pulses received at the plurality of antennas, the angular information indicating an angle between a pointing direction of the first mobile device and the second mobile device;
    determining, based on the distance information and the angular information, a first probability that a position of the second mobile device lies within a first spatial region having a defined distance range and aligned with the pointing direction of the first mobile device;
    determining an importance metric for the second mobile device based on the first probability;
    determining that the importance metric exceeds a threshold; and
    based on determining that the importance metric exceeds the threshold, providing a user interface that includes the second mobile device as a device with which to communicate.

2. The method of claim 1, further comprising:
    storing, in a memory of the first mobile device, a set of importance values corresponding to a set of spatial regions defined at specified distances and angles around the first mobile device, the set of spatial regions including the first spatial region;
    determining, based on the distance information and the angular information, a set of probabilities of the second mobile device being within the set of spatial regions, the set of probabilities including the first probability; and
    determining the importance metric for the second mobile device based on the set of probabilities and the set of importance values.

3. The method of claim 2, wherein determining the importance metric includes:
    multiplying each of the set of probabilities by a corresponding importance value to obtain intermediate results; and
    summing the intermediate results.

4. The method of claim 3, wherein determining the importance metric further includes:
    receiving an indication that the second mobile device lies within a field of view of the first mobile device; and
    in response to receiving the indication that the second mobile device lies within the field of view, multiplying each of the set of probabilities by a second probability that the second mobile device lies within the field of view.

5. The method of claim 3, wherein determining the importance metric further includes:
  receiving an indication that the second mobile device lies outside a field of view of the first mobile device; and
  in response to receiving the indication that the second mobile device lies outside the field of view, multiplying each of the set of probabilities by a second probability that the second mobile device lies outside the field of view.

6. The method of claim 1, wherein the threshold is a fixed value.

7. The method of claim 1, wherein the threshold is a value equal to a second highest importance metric.

8. The method of claim 1, further comprising:
  determining importance metrics for a set of third mobile devices;
  ordering each of the set of third mobile devices and the second mobile device based on the importance metrics determined for each of the set of third mobile devices and the importance metric determined for the second mobile device.

9. The method of claim 8, further comprising:
  including on the user interface a number of highest ranking mobile devices of the second mobile device and the set of third mobile devices having importance metrics exceeding the threshold.

10. The method of claim 1, further comprising:
  transmitting, by the first mobile device using a second wireless protocol, a third set of one or more pulses in a ranging request message to a third mobile device, the first mobile device including a second plurality of antennas configured to receive signals using the second wireless protocol;
  receiving, at the second plurality of antennas, a fourth set of one or more pulses in one or more ranging response messages from the third mobile device;
  determining second distance information corresponding to a signal strength indication of the fourth set of one or more pulses received at the second plurality of antennas;
  determining, based on the second distance information, a second probability that a position of the third mobile device lies within a second spatial region outside a field of view of the first mobile device;
  determining an importance metric for the third mobile device based on the second probability;
  determining that the importance metric exceeds the threshold; and
  in response to determining that the importance metric for the third mobile device exceeds the threshold, including the third mobile device on the user interface as a device with which to communicate.

11. A non-transitory computer readable medium having stored thereon instructions for causing one or more processors to perform operations comprising:
  transmitting, using a first wireless protocol, a first set of one or more pulses in a ranging request message to from a first mobile device to a second mobile device, the first mobile device including a plurality of antennas configured to receive signals using the first wireless protocol;
  receiving, at the plurality of antennas, a second set of one or more pulses in one or more ranging response messages from the second mobile device;
  determining distance information and angular information corresponding to one or more transmission times of the first set of one or more pulses and one or more reception times of the second set of one or more pulses received at the plurality of antennas, the angular information indicating an angle between a pointing direction of the first mobile device and the second mobile device;
  determining, based on the distance information and the angular information, a first probability that a position of the second mobile device lies within a first spatial region having a defined distance range and aligned with the pointing direction of the first mobile device;
  determining an importance metric for the second mobile device based on the first probability;
  determining that the importance metric exceeds a threshold; and
  based on determining that the importance metric exceeds the threshold, providing a user interface that includes the second mobile device as a device with which to communicate.

12. The non-transitory computer readable medium as defined in claim 11, further comprising instructions to perform operations including:
  storing, in a memory of the first mobile device, a set of importance values corresponding to a set of spatial regions defined at specified distances and angles around the first mobile device, the set of spatial regions including the first spatial region;
  determining, based on the distance information and the angular information, a set of probabilities of the second mobile device being within the set of spatial regions, the set of probabilities including the first probability; and
  determining the importance metric for the second mobile device based on the set of probabilities and the set of importance values.

13. The non-transitory computer readable medium as defined in claim 12, further comprising instructions to perform operations including:
  determining the importance metric by:
    multiplying each of the set of probabilities by a corresponding importance value to obtain intermediate results; and
    summing the intermediate results.

14. The non-transitory computer readable medium as defined in claim 13, further comprising instructions to perform operations including:
  determining the importance metric by:
    receiving an indication that the second mobile device lies within a field of view of the first mobile device; and
    in response to receiving the indication that the second mobile device lies within the field of view, multiplying each of the set of probabilities by a second probability that the second mobile device lies within the field of view.

15. The non-transitory computer readable medium as defined in claim 13, further comprising instructions to perform operations including:
  determining the importance metric by:
    in response to receiving the indication that the second mobile device lies outside the field of view, multiplying each of the set of probabilities by a second probability that the second mobile device lies outside the field of view.

16. The non-transitory computer readable medium as defined in claim 11, further comprising instructions to perform operations including:
  determining that the importance metric exceeds a fixed threshold value.

17. The non-transitory computer readable medium as defined in claim 11, further comprising instructions to perform operations including:
   determining that the importance metric exceeds a threshold value equal to a second highest importance metric.

18. The non-transitory computer readable medium as defined in claim 11, further comprising instructions to perform operations including:
   determining importance metrics for a set of third mobile devices;
   ordering each of the set of third mobile devices and the second mobile device based on the importance metrics determined for each of the set of third mobile devices and the importance metric determined for the second mobile device.

19. The non-transitory computer readable medium as defined in claim 18, further comprising instructions to perform operations including:
   on the user interface, including a number of highest ranking mobile devices of the second mobile device and the set of third mobile devices having importance metrics exceeding the threshold.

20. The non-transitory computer readable medium as defined in claim 11, further comprising instructions to perform operations including:
   transmitting, by the first mobile device using a second wireless protocol, a third set of one or more pulses in a ranging request message to a third mobile device, the first mobile device including a second plurality of antennas configured to receive signals using the second wireless protocol;
   receiving, at the second plurality of antennas, a fourth set of one or more pulses in one or more ranging response messages from the third mobile device;
   determining second distance information corresponding to a signal strength indication of the fourth set of one or more pulses received at the second plurality of antennas;
   determining, based on the second distance information, a second probability that a position of the third mobile device lies within a second spatial region outside a field of view of the first mobile device;
   determining an importance metric for the third mobile device based on the second probability;
   determining that the importance metric exceeds the threshold; and
   in response to determining that the importance metric for the third mobile device exceeds the threshold, including the third mobile device on the user interface as a device with which to communicate.

21. A mobile device, comprising:
   a memory configured to store processor-executable instructions; and
   one or more processors configured for executing the instructions stored in the memory, the instructions being executable for causing the one or more processors to perform operations comprising:
      transmitting, using a first wireless protocol, a first set of one or more pulses in a ranging request message to from the mobile device to a second mobile device, the mobile device including a plurality of antennas configured to receive signals using the first wireless protocol;
      receiving, at the plurality of antennas, a second set of one or more pulses in one or more ranging response messages from the second mobile device;
      determining distance information and angular information corresponding to one or more transmission times of the first set of one or more pulses and one or more reception times of the second set of one or more pulses received at the plurality of antennas, the angular information indicating an angle between a pointing direction of the mobile device and the second mobile device;
      determining, based on the distance information and the angular information, a first probability that a position of the second mobile device lies within a first spatial region having a defined distance range and aligned with the pointing direction of the mobile device;
      determining an importance metric for the second mobile device based on the first probability;
      determining that the importance metric exceeds a threshold; and
      based on determining that the importance metric exceeds the threshold, providing a user interface that includes the second mobile device as a device with which to communicate.

22. The mobile device of claim 21, wherein the one or more processors are further configured for executing the instructions stored in the memory to perform operations including:
   storing, in the memory of the mobile device, a set of importance values corresponding to a set of spatial regions defined at specified distances and angles around the mobile device, the set of spatial regions including the first spatial region;
   determining, based on the distance information and the angular information, a set of probabilities of the second mobile device being within the set of spatial regions, the set of probabilities including the first probability; and
   determining the importance metric for the second mobile device based on the set of probabilities and the set of importance values.

23. The mobile device of claim 22, wherein the one or more processors are further configured for executing the instructions stored in the memory to perform operations including:
   determining the importance metric by:
      multiplying each of the set of probabilities by a corresponding importance value to obtain intermediate results; and
      summing the intermediate results.

24. The mobile device of claim 23, wherein the one or more processors are further configured for executing the instructions stored in the memory to perform operations including:
   determining the importance metric by:
      receiving an indication that the second mobile device lies within a field of view of the first mobile device; and
      in response to receiving the indication that the second mobile device lies within the field of view, multiplying each of the set of probabilities by a second probability that the second mobile device lies within the field of view.

25. The mobile device of claim 24, wherein the one or more processors are further configured for executing the instructions stored in the memory to perform operations including:
   determining the importance metric by:
      in response to receiving the indication that the second mobile device lies outside the field of view, multiplying each of the set of probabilities by a second probability that the second mobile device lies outside the field of view.

26. The mobile device of claim 21 wherein the one or more processors are further configured for executing the instructions stored in the memory to perform operations including:
determining that the importance metric exceeds a fixed threshold value.

27. The mobile device of claim 21, wherein the one or more processors are further configured for executing the instructions stored in the memory to perform operations including:
determining that the importance metric exceeds a threshold value equal to a second highest importance metric.

28. The mobile device of claim 21, wherein the one or more processors are further configured for executing the instructions stored in the memory to perform operations including:
determining importance metrics for a set of third mobile devices;
ordering each of the set of third mobile devices and the second mobile device based on the importance metrics determined for each of the set of third mobile devices and the importance metric determined for the second mobile device.

29. The mobile device of claim 28, wherein the one or more processors are further configured for executing the instructions stored in the memory to perform operations including:
on the user interface, including a number of highest ranking mobile devices of the second mobile device and the set of third mobile devices having importance metrics exceeding the threshold.

30. The mobile device of claim 21, wherein the one or more processors are further configured for executing the instructions stored in the memory to perform operations including:
transmitting, by the first mobile device using a second wireless protocol, a third set of one or more pulses in a ranging request message to a third mobile device, the first mobile device including a second plurality of antennas configured to receive signals using the second wireless protocol;
receiving, at the second plurality of antennas, a fourth set of one or more pulses in one or more ranging response messages from the third mobile device;
determining second distance information corresponding to a signal strength indication of the fourth set of one or more pulses received at the second plurality of antennas;
determining, based on the second distance information, a second probability that a position of the third mobile device lies within a second spatial region outside a field of view of the first mobile device;
determining an importance metric for the third mobile device based on the second probability;
determining that the importance metric exceeds the threshold; and
in response to determining that the importance metric for the third mobile device exceeds the threshold, including the third mobile device on the user interface as a device with which to communicate.

* * * * *

UNITED STATES PATENT AND TRADEMARK OFFICE
CERTIFICATE OF CORRECTION

| | |
|---|---|
| PATENT NO. | : 10,735,900 B1 |
| APPLICATION NO. | : 16/573422 |
| DATED | : August 4, 2020 |
| INVENTOR(S) | : Benjamin A. Werner, Brent M. Ledvina and Merrick K. McCracken |

Page 1 of 1

It is certified that error appears in the above-identified patent and that said Letters Patent is hereby corrected as shown below:

In the Claims

Claim 11, Column 25, Line 57, delete the word "to" after a ranging request message.

Claim 21, Column 27, Line 60, delete the word "to" after a ranging request message.

Signed and Sealed this
First Day of September, 2020

Andrei Iancu
*Director of the United States Patent and Trademark Office*